(12) United States Patent
Wu

(10) Patent No.: US 6,441,302 B1
(45) Date of Patent: Aug. 27, 2002

(54) JUNCTION BOX MOUNT STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 09/915,267

(22) Filed: Jul. 27, 2001

(51) Int. Cl.⁷ .................................................. H01J 5/00
(52) U.S. Cl. ........................... 174/50; 174/48; 174/50; 174/58; 174/63; 174/17 R; 174/138 G; 220/3.3; 220/3.6; 220/3.8; 220/4.02; D13/156
(58) Field of Search .............................. 174/50, 48, 58, 174/63, 17 R, 138 G; 220/3.3, 3.6, 3.8, 4.02; 248/906; 439/70, 188, 11, 449, 535, 489; D13/156

(56) References Cited

U.S. PATENT DOCUMENTS

| | | | | |
|---|---|---|---|---|
| 4,957,450 A | * | 9/1990 | Pioszak | 439/369 |
| 5,336,103 A | * | 8/1994 | Herboldsheimer | |
| 5,454,729 A | * | 10/1995 | Wen-Te | 439/357 |
| 5,883,332 A | * | 3/1999 | Collard | 174/57 |

* cited by examiner

*Primary Examiner*—Anthony Dinkins
*Assistant Examiner*—Anton Harris
(74) *Attorney, Agent, or Firm*—Bacon & Thomas, PLLC

(57) ABSTRACT

A junction box mount structure in which a plug holder is secured by insertion within the interior section of the junction box that has a mount installed in an opening through the side of a junction box and a plug holder inserted onto the mount. The mount has a laterally extending collar section that is inserted into the junction box opening and, furthermore, the plug holder is aligned with and slipped into the collar section, and thereby positioned within the interior section of the mount. A retainer element is movably conjoined to each of the two sides of the mount and, furthermore, under normal conditions, the free ends of the retaining elements are tightly pulled by an elastic component and drawn into a state of compression such that after the plug holder is inserted, it is maintained in position by the retaining elements and cannot be pulled out while restrained within the mount. As such, this provides for the direct insertion of the plug holder into the collar section and securing it to the mount without requiring additional fastening screws and tools to thereby effectively facilitate ease of assembly and installation.

4 Claims, 5 Drawing Sheets

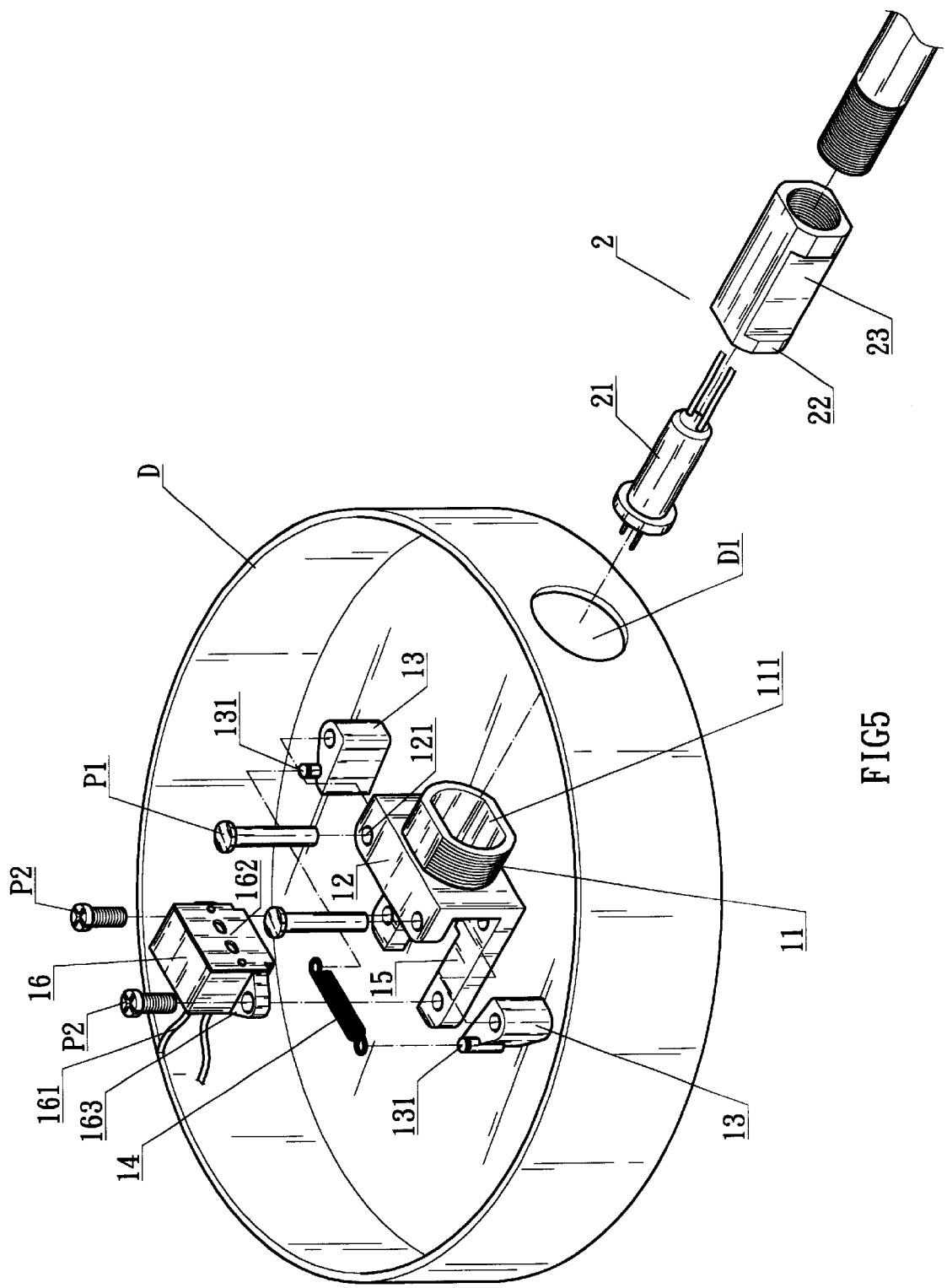

JUNCTION BOX MOUNT STRUCTURE

BACKGROUND OF THE INVENTION

1) Field of the Invention

The invention herein relates to a junction box mount structure in which the mount has a laterally extending collar section that is inserted into an opening of the junction box and, furthermore, a plug holder is secured by alignment with and insertion into the interior section of the mount; a retainer element is movably conjoined to each of the two sides of the mount and, furthermore, under normal conditions, the free ends of the retaining elements are tightly pulled by an elastic component and drawn into a state of compression, a structural feature wherein the plug holder is maintained in position by the retaining elements and cannot be pulled out; as such, this provides for the direct insertion of the plug holder into the collar section and securing it to the mount without requiring additional fastening screws and tools to thereby effectively facilitate ease of assembly and installation.

2) Description of the Prior Art

Conventional junction box structures purpose-built for utilization with wall lamps, table lamps, and floor lamps involve fastening by means of screws and nuts; however, the use of such fasteners for assembly and installation not only subjects finished products to damage, but also requires tools (such as wrenches and screwdrivers, etc.) that often cause assembly and installation difficulties; in view of the said drawbacks, the inventor of the invention herein conducted research that culminated in the successful development of the present invention.

SUMMARY OF THE INVENTION

The primary objective of the invention herein is to provide a junction box mount structure comprised of a mount installed in an opening through the side of a junction box and a plug holder secured by insertion onto the mount, wherein the mount has a laterally extending collar section that is slipped into the junction box opening and the plug holder is installed by alignment with the collar section and insertion into the interior section of the mount; a retainer element is movably conjoined to each of the two sides of the mount and, furthermore, under normal conditions, the free ends of the retaining elements are tightly pulled by an elastic component and drawn into a state of compression such that after the plug holder has been inserted, it is maintained in position by the retaining elements and cannot be pulled out; as such, this provides for the direct insertion of the plug holder into the collar section and securing it to the mount without requiring additional fastening screws and tools to thereby effectively facilitate ease of assembly and installation.

Another objective of the invention herein is to provide a junction box mount structure that accommodates the utilization of different type sockets and plugs, including a socket configured with one large and one small prong hole to accommodate a plug having a structural arrangement of one large and one small prong to thereby provide for insertion and continuity and, furthermore, a socket of a single-prong hole configuration to accommodate a plug having a single-prong structural arrangement to thereby provide for insertion and continuity.

BRIEF DESCRIPTION OF THE DRAWINGS

FIG. 3-B is an orthographic drawing of the invention herein as the plug holder in being inserted.

FIG. 3-C is an orthographic drawing of after the plug holder is inserted.

FIG. 5 is an exploded drawing of a different plug and socket embodiment of the invention herein (2).

DETAILED DESCRIPTION OF THE INVENTION

Figure 1:
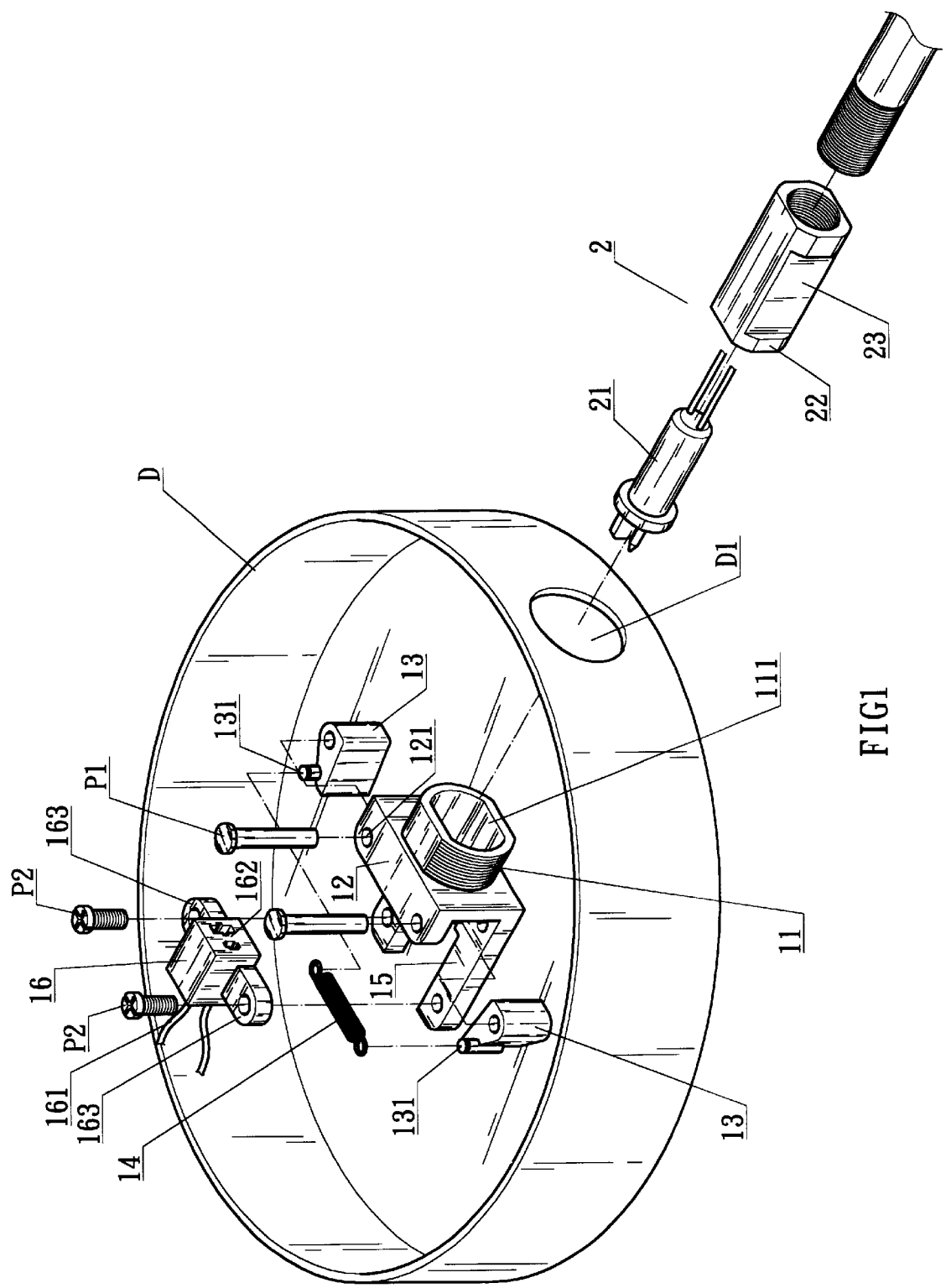
FIG. 1 is an exploded drawing of the invention herein.
Figure 2:
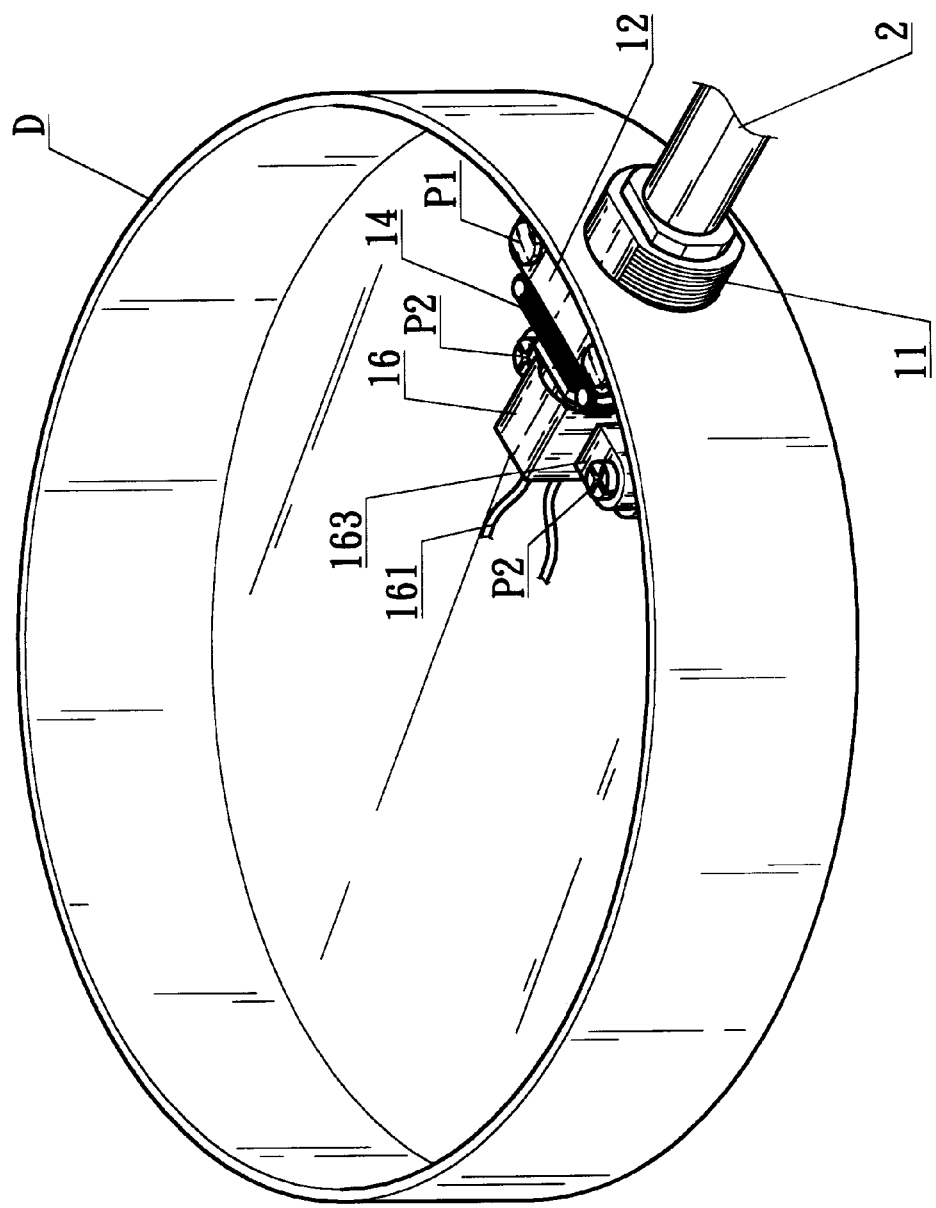
FIG. 2 is an isometric drawing of the assembled invention herein.

Referring to FIG. 1 and FIG. 2, the structural arrangement of the present invention, the invention herein is comprised of a mount 1 installed in an opening D1 through the side of a junction box D and a plug holder 2 inserted into the interior section of the mount 1, of which:

The said mount 1 has a laterally extending collar section 11 that is inserted into the junction box D opening D1 and, furthermore, an oblate bore 111 is formed through the interior portion of the collar section 11; and the mount 1 is positioned at the other side on an L-shaped platform within junction box D interior.

The said platform consists of an upper surface 12 having a mounting hole 121 formed in each of its two sides and, furthermore, a retaining element 13 is movably conjoined onto each mounting hole 121 by a pin P1 such that the retaining element 13 is capable of an appropriate degree of rotation on the conjoinment section support point, each said retaining element 13 has a free end 131 onto which an elastic component 14 is installed to couple the two retaining elements 13 and, furthermore, under normal conditions, the elastic component 14 tightly pulls the free ends 131 of the retaining elements 13 and draws them into a state of compression.

The said platform has a lower surface 15 that is longer than the upper surface 12 of the platform and, furthermore, a socket 16 is fastened by screws P2 to the end of the lower surface 15 such that the socket 16 is situated at the rear extremity of the retaining elements 13; the socket 16 has a power source wire 161 at one side and a power terminal 162 on the other side that provides for plug-in connectivity and, furthermore, there is a tab 163 at the each of the two sides of the socket 16 that accommodates the insertion of a screw P2 for fastening the socket 16 to the lower surface 15 of the mount 1.

The said plug holder 2 is an oblate-profiled tubular structure aligned with the mount 1 bore 111 that provides for the insertion of the plug holder 2 within the bore 111 of the mount 1, the plug holder 2 has a plug 21 conjoined at its front end and, furthermore, projecting laterally from the end area of the plug holder 2 is a catch tip 22 and formed in the side of the catch tip 22 is a recess 23 that provides for the outward impelling of the retaining element 13 free ends 131 by the catch tip 22 after the insertion of the plug holder 2 such that when the plug 21 is inserted into the socket 16, the recess 23 contains the retaining elements 13 and allows them to return to their original positions, with the retaining elements 13 maintaining the plug holder 2 in position and preventing its removal by pulling.

Figure 3:
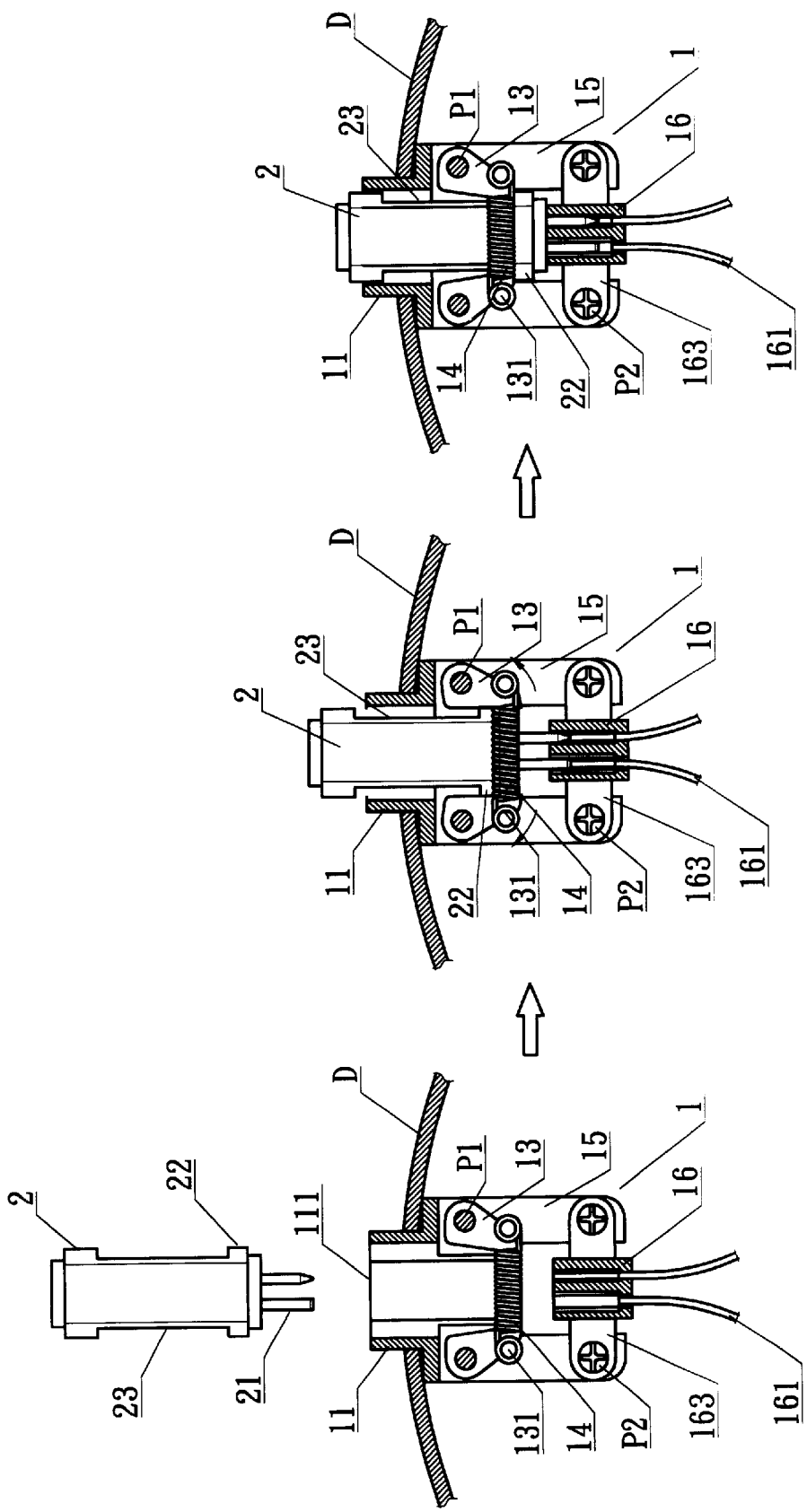
FIG. 3-A is an orthographic drawing of invention herein under normal conditions.

Regarding the operation of the said junction box D, referring to FIG. 3, under normal conditions, the free ends 131 of the retaining elements 13 are tightly pulled by the elastic component and are in a state of compression (as shown in FIG. 3-A).

When the plug holder 2 is inserted into the collar section 11 of the mount 1, the plug holder 2 catch tip 22 exerts outwardly against the retaining element 13 free ends 131 and stretches the elastic component 14 installed at the upper extent of the retaining element 13 free ends 131, thereby providing for the insertion of the plug holder 2 into the bore 111 (as shown in FIG. 3-B).

After the plug holder 2 plug 21 is inserted into the socket 16, the plug holder 2 catch tip 22 moves past the retaining elements 13 and the elastic component 14, causing the restoral of the elastic component 14 back to its original state which then results in the return of the retaining elements 13 to their original positions and their inward closure once again such that following insertion past the retaining elements 13, the plug holder 21 and the plug 2 are maintained in place by the retaining elements 13 and cannot pulled out to thereby remain securely positioned on the mount 1 (as shown in FIG. 3-C).

As such, following the insertion of the plug holder 2 into the collar section 11 of the mount 1, securing it to the mount 1 does not require additional fastening screws and tools to thereby effectively facilitate ease of assembly and installation.

Figure 4:
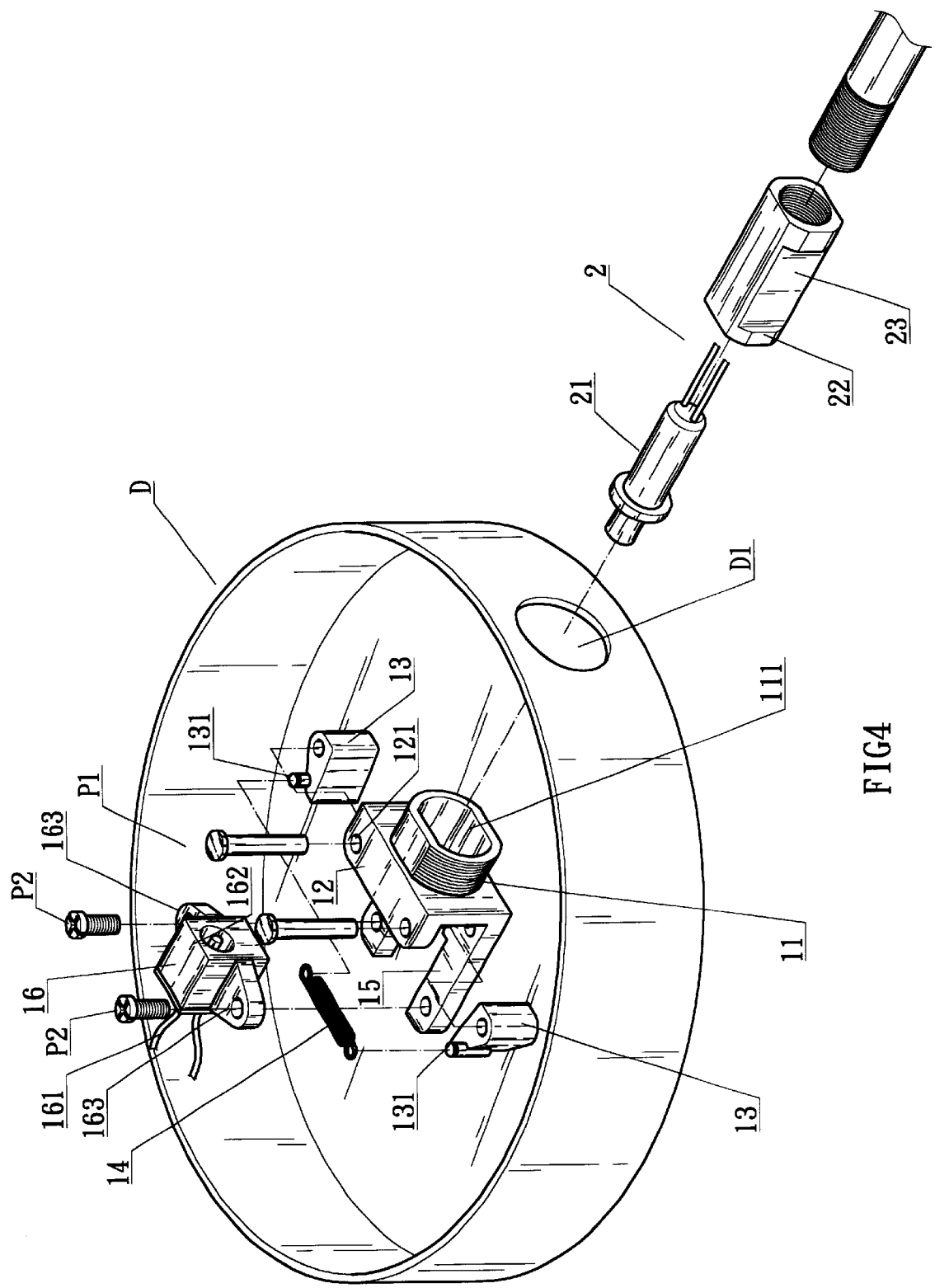
FIG. 4 is an exploded drawing of a different plug and socket embodiment of the invention herein (1).

Referring to FIG. 4 and FIG. 5, the invention herein accommodates the utilization of different type sockets and plugs, wherein the socket 16 in FIG. 5 is configured with one large and one small prong hole to accommodate the large and small prong structural arrangement of the plug 21 and thereby provide for insertion and continuity; the socket in FIG. 4 is of a single-prong hole configuration to accommodate the single-prong structural arrangement of the plug 21 and thereby provide for insertion and continuity.

What is claimed is:

1. A junction box mount structure comprised of a mount installed in an opening through the side of a junction box and a plug holder inserted into the interior section of the said mount, of which:

The said mount has a bore extending laterally from one end and, furthermore, a collar section that is inserted into the said junction box opening; two retaining elements are movably conjoined by screws at the other side and an elastic component is coupled to the free ends of the two said retaining elements and, furthermore, under normal conditions, the said elastic component tightly pulls the said free ends of the said retaining elements and draws them into a state of compression; a socket is fastened by screws towards the end and, furthermore, the said socket is situated at the rear extremity of the said retaining elements;

The said plug holder is a tubular structure aligned with the said mount collar section; the said plug holder has a plug conjoined at its front end and, furthermore, projecting laterally from the end area of the said plug holder is a catch tip and formed along the side of the said catch tip is a recess thus providing for the outward pushing of the said retaining element free ends by the said catch tip after the insertion of the plug holder as well as the containing of the said retaining elements by the said recess that allows them to return to their original positions, thereby enabling the said retaining elements to maintain the said plug holder in position and prevent its removal by pulling;

As such, ease of assembly and installation is effectively facilitated.

2. As mentioned in claim 1 of the junction box mount structure of the invention herein, the said mount accommodates the utilization of different type sockets and plugs, including a socket configured with one large and one small prong hole to accommodate a plug having a structural arrangement of one large and one small prong to thereby provide for insertion and continuity and, furthermore, a socket of a single-prong hole configuration to accommodate a plug having a single-prong structural arrangement to thereby provide for insertion and continuity.

3. As mentioned in claim 1 of the junction box mount structure of the invention herein, the said socket has a power source wire at one side and a power terminal on the other side that provides for plug-in connectivity and, furthermore, there is a tab at the each of the two sides of the said socket that accommodates the insertion of a screw for fastening the said socket to the lower surface of the said mount.

4. As mentioned in claim 1 of the junction box mount structure of the invention herein, the said Junction box collar section and its bore can be of a triangular, rectangular, pentagonal, or other polygonal profile structure.

* * * * *